US009008356B1

(12) United States Patent
Toshev et al.

(10) Patent No.: US 9,008,356 B1
(45) Date of Patent: Apr. 14, 2015

(54) PERCEPTUALLY-DRIVEN REPRESENTATION FOR OBJECT RECOGNITION

(75) Inventors: Alexander T. Toshev, San Francisco, CA (US); Jay Yagnik, Santa Clara, CA (US); Vivek Kwatra, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 594 days.

(21) Appl. No.: 13/301,623

(22) Filed: Nov. 21, 2011

(51) Int. Cl.
*G06K 9/00* (2006.01)
*G06K 9/48* (2006.01)
*G06T 7/20* (2006.01)

(52) U.S. Cl.
CPC ........................................ *G06T 7/20* (2013.01)

(58) Field of Classification Search
None
See application file for complete search history.

(56) References Cited

U.S. PATENT DOCUMENTS

| | | | | |
|---|---|---|---|---|
| 5,978,497 A * | 11/1999 | Lee et al. | ........ | 382/133 |
| 6,167,150 A * | 12/2000 | Michael et al. | ........ | 382/149 |
| 6,941,016 B1 * | 9/2005 | Wagman et al. | ........ | 382/199 |
| 7,831,087 B2 * | 11/2010 | Harville | ........ | 382/154 |
| 8,391,955 B2 * | 3/2013 | Erbel et al. | ........ | 600/425 |
| 8,447,107 B1 * | 5/2013 | Dhua et al. | ........ | 382/170 |
| 8,452,109 B2 * | 5/2013 | Alldrin et al. | ........ | 382/225 |
| 8,467,607 B1 * | 6/2013 | Toshev et al. | ........ | 382/173 |
| 8,649,556 B2 * | 2/2014 | Wedge | ........ | 382/103 |
| 2008/0123945 A1 * | 5/2008 | Andrew et al. | ........ | 382/164 |
| 2008/0313140 A1 * | 12/2008 | Pereira et al. | ........ | 707/2 |
| 2010/0166262 A1 * | 7/2010 | Wedge | ........ | 382/103 |
| 2011/0170768 A1 * | 7/2011 | Alldrin et al. | ........ | 382/159 |
| 2011/0254950 A1 * | 10/2011 | Bibby et al. | ........ | 348/135 |
| 2012/0155754 A1 * | 6/2012 | Chen et al. | ........ | 382/164 |
| 2013/0035081 A1 * | 2/2013 | Sanger | ........ | 455/414.2 |

* cited by examiner

*Primary Examiner* — Wenpeng Chen
(74) *Attorney, Agent, or Firm* — Lowenstein Sandler LLP (57) ABSTRACT

Methods and systems for processing an image to facilitate automated object recognition are disclosed. More particularly, an image is processed based on a perceptual grouping for the image (e.g., derived via segmentation, derived via contour detection, etc.) and a geometric-configuration model for the image (e.g., a bounding box model, a constellation, a k-fan, etc.).

23 Claims, 6 Drawing Sheets

PERCEPTUALLY-DRIVEN REPRESENTATION FOR OBJECT RECOGNITION

TECHNICAL FIELD

Embodiments of the present invention relate to data processing, and more specifically, to image processing.

BACKGROUND

A digital image is generally a representation of a real image (e.g., a photograph) in a format which may be processed by a computer system. A digital image generally comprises a plurality of picture elements (e.g., pixels) arranged in a two-dimensional array. Each pixel may have a color and/or a color value associated with the pixel. Information associated with the location and color of each pixel may be stored and/or used by a computer system to display the digital image.

Object detection is the task of ascertaining that a set of pixels in an image is associated with a particular object. Object recognition is the task of identifying what the object is (e.g., a car, a tree, etc.). Although humans can detect and recognize objects in images with little effort, these tasks are particularly challenging for computer systems. There are multiple techniques for performing object detection and object recognition. However, current object detection and object recognition techniques still fail to accurately detect and recognize objects in many instances.

SUMMARY

In an embodiment of the present invention, a computing device identifies a perceptual grouping for an image, where the perceptual grouping is based on the contents of the image and partitions the image into a plurality of disjoint groups of pixels. In accordance with the embodiment, the computing device further identifies a geometric-configuration model for the image, wherein the geometric-configuration model comprises a set of bins located at predefined intervals within the image. The computing device then processes the image based on the perceptual grouping and the geometric-configuration model to detect one or more objects in the image.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Methods and systems are described for processing an image to facilitate automated object recognition. In an embodiment of the present invention, a computing device employs both a perceptual grouping of an image and a geometric-configuration model of the image. A perceptual grouping partitions the image into a plurality of groups, where each group consists of a proper subset of pixels in the image, and where the partitioning into groups is based on the contents of the image. An example of a perceptual grouping is segmentation, where an image is partitioned into a set of regions called segments that consist of pixels with similar features (e.g., color, texture, intensity, etc.). Such groupings are called perceptual because the groups of pixels are determined based on how the objects in the image are perceived by the viewer at a particular viewpoint. The pixel groups of a perceptual grouping are characterized by the fact that they can be of any size and shape, depending on the pixels of the image. In an alternative type of perceptual grouping called contour detection, a group is comprised of the pixels along a contour (e.g., an outline of a car, a curve that defines the border between two differently-color regions in an image, etc.). As in segmentation, a perceptual grouping of contour detection yields groups that are of arbitrary size and shape and depend on the contents of the image.

A geometric-configuration model for the image, which is also employed by the computing device, divides a region into bins, where the bins have a pre-determined size and shape and are independent of the pixel values contained therein. A bounding box is a type of geometric-configuration model, as the arrangement of the bins is determined a priori without consideration of the pixel values within the bounding box. For example, a bounding box that is superimposed on a two-dimensional array of orange, pink, and white pixels is divided into fixed bins regardless of which pixels are orange, which pixels are pink, and which pixels are white.

By employing both a perceptual grouping and a geometric-configuration model, embodiments of the present invention can combine the advantages of both approaches. For example, the geometric-configuration model has the advantage that computations involving the model can be performed using a fixed-size vector in memory. The perceptual grouping, meanwhile, has the advantage of partitioning the image into regions that more closely correspond to the objects in the image.

In an embodiment of the present invention, the computing device integrates both the perceptual grouping and the geometric-configuration model by examining the individual pixels in the bins of the geometric-configuration model and assigning to each combination of pixel and group a measure of how strongly the pixel belongs to the group. For example, if a pixel in a bin of a bounding box is in the center of a segment, the membership of the pixel in that segment can intuitively be considered strong. Conversely, if a pixel is not inside a particular segment and is not even close to the border of that segment, the membership of the pixel in that segment can intuitively be considered weak.

In an embodiment of the present invention, a value is computed for each pair of bins and each group, based on the membership measures of the individual pixels in each of the two bins. The resulting value is thus an overall reflection of how strongly the two bins belong to a particular segment, and provides higher-order information for object detection and recognition algorithms than a mapping of individual bins to individual segments or individual segments to individual bins.

Advantageously, the computed values are an overall reflection of how strongly each pair of bins belongs to a particular segment, and provides higher-order information for object detection and recognition algorithms than a mapping of individual bins to individual segments or individual segments to individual bins.

Note that embodiments of the present invention are described with reference to images. However, embodiments of the present invention also apply to videos. For example, embodiments of the present invention may perform object detection and object recognition for frames of a video. Alternatively, embodiments of the present invention may combine estimates over multiple frames to perform object detection and recognition.

Note also that embodiments of the present invention are described with reference to bounding boxes. A bounding box of an object is a smallest rectangle that bounds an object in an image. The bounding box may have sides aligned to the image, or may have sides aligned to a shape of the bounded object. A bounding box is one type of geometric configuration model. It should be understood that embodiments of the present invention may also be used to determine other types of geometric configuration models, such as constellations, k-fans, and so forth.

Additionally, embodiments of the present invention are discussed with reference to image segmentation. A segment may be a region that consists of pixels with similar features (e.g., color, texture, intensity, etc.). Alternative embodiments, however, may perform other types of perceptual grouping (e.g., contour detection, etc.).

Figure 1:
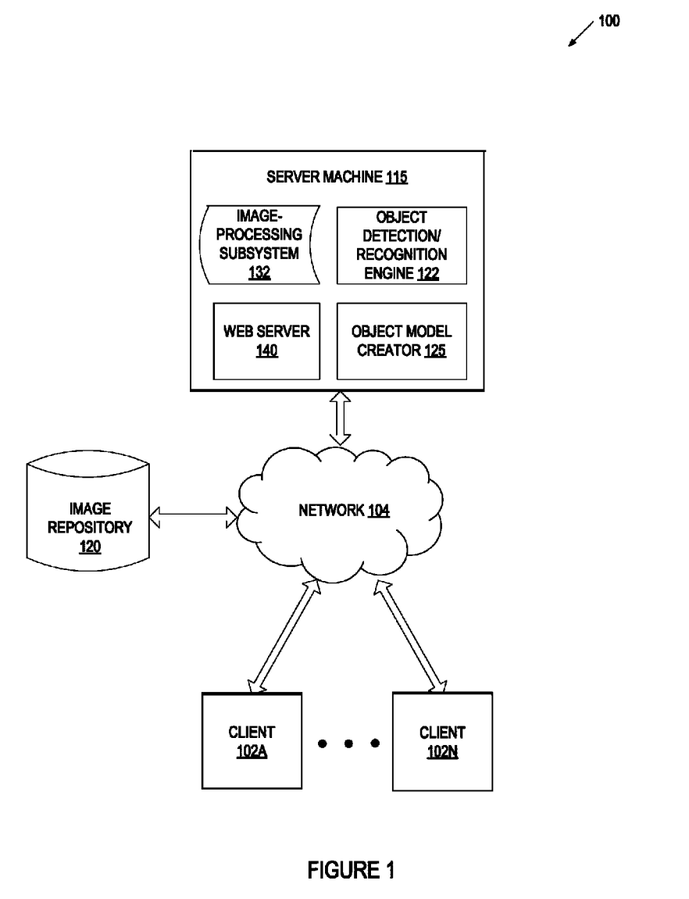
FIG. 1 illustrates an exemplary system architecture, in accordance with one embodiment of the present invention.

FIG. 1 illustrates an example system architecture 100, in accordance with one embodiment of the present invention. The system architecture 100 includes a server machine 115, an image repository 120 and client machines 102A-102N connected to a network 104. Network 104 may be a public network (e.g., the Internet), a private network (e.g., a local area network (LAN) or wide area network (WAN)), or a combination thereof.

The client machines 102A-102N may be personal computers (PC), laptops, mobile phones, tablet computers, or any other computing devices. The client machines 102A-102N may run an operating system (OS) that manages hardware and software of the client machines 102A-102N. A browser (not shown) may run on the client machines (e.g., on the OS of the client machines). The browser may be a web browser that can access content served by a web server. The browser may issue image search queries to the web server or may browse images and/or videos that have previously been classified. The client machines 102A-102N may also upload images to the web server for storage and/or classification.

Server machine 115 may be a rackmount server, a router computer, a personal computer, a portable digital assistant, a mobile phone, a laptop computer, a tablet computer, a camera, a video camera, a netbook, a desktop computer, a media center, or any combination of the above. Server machine 115 includes a web server 140, an image-processing subsystem 132, an object detection/recognition engine 122, and an object model creator 125. In alternative embodiments, the web server 140, object detection/recognition engine 122 and/ or object model creator 125 may run on different machines. Additionally, in some embodiments, the object detection/ recognition engine 122 and object model creator 125 may be combined into a single module.

Image repository 120 is a persistent storage that is capable of storing images and/or video. In some embodiments image repository 120 might be a network-attached file server, while in other embodiments image repository 120 might be some other type of persistent storage such as an object-oriented database, a relational database, and so forth, that may be hosted by the server machine 115 or one or more different machines coupled to the server machine 115 via the network 104. The images and video stored in the image repository 120 may include user-generated content that is uploaded by client machines. The images and video may additionally or alternatively include content provided by service providers such as news organizations, publishers, libraries and so on.

Web server 140 may serve images from image repository 120 to clients 102A-102N. Web server 140 may receive image search queries and perform searches on the images in the image repository 120 to determine images that satisfy the image search query. Web server 140 may then send to a client 102A-102N those images that match the search query.

In order for the image repository 120 to be searchable, the images in the image repository 120 may be classified. In one embodiment, object detection/recognition engine 122 classifies the images 126 in the image repository 120. Classifying the images may include performing object detection on the images (identifying the locations of objects in the images) as well as performing object recognition on the objects (determining object classes for those detected objects). The images may then be classified based on the objects that the images contain.

In accordance with some embodiments, image-processing subsystem 132 determines a perceptual grouping for the image (e.g., segmentation of the image, contour detection, etc.) and a geometric-configuration model of the image (e.g., a bounding box, etc.). In one such embodiment, image-processing subsystem 132 segments the image and determines one or more bounding boxes in the image. The size and position of the bounding box may be determined in any one of a number of ways. For example, in some embodiments the size of the bounding box for a particular object type might be determined during training based on manually-labeled bounding boxes of objects. In such embodiments, for each model one can exhaustively try all possible locations and scales within an input image.

The image-processing subsystem 132 then processes an image based on both a perceptual grouping for the image (e.g., derived via segmentation, derived via contour detection, etc.) and a geometric-configuration model for the image (e.g., a bounding box model, a bounding box model in combination with a histogram of oriented gradients [HOG], a constellation, a k-fan, a shape context, one or more scale-invariant feature transforms [SIFTs] defined at a larger context, etc.). An embodiment of image-processing subsystem 132 is described in detail below and with respect to FIGS. 2 through 6.

Object model creator 125 is capable of creating one or more models of one or more objects in the image based on the processing performed by image-processing subsystem 132. Object model creator 125 may use any combination of one or more techniques for creating an object model. For example, in some embodiments, object model creator 125 may "learn" an object model from labeled training data, where the objects of interest in each image in the training data have a manually-selected bounding box. For each such label object, one can extract a representation as described above. This representation can be used to train any standard classifier, such as a Support Vector Machine (SVM), AdaBoost, etc. to obtain a model.

Object detection/recognition engine 122 is capable of detecting and recognizing objects in the image based on the object models. Examples of an object include a car, a tree, a person, a face, a building, and so forth. Object detection/ recognition engine 122 may use any combination of one or more techniques for performing object detection, such as techniques that employ a histogram of oriented gradients (HOG), or part-models such as k-fans, constellation models, pictorial structure, and so forth.

Additionally, object detection/recognition engine 122 may use any combination of one or more techniques for performing object recognition, such as computer aided design (CAD)-like approaches (e.g., Marr, Mohan and Nevatia, Lowe, Faugeras, etc.), recognition by parts (e.g., Binford, Biederman, Dickinson, Forsyth and Ponce, etc.), appearance-based methods (e.g., edge matching, divide-and-conquer search, grayscale matching, gradient matching, etc.), feature-based techniques (e.g., such as interpretation trees, hypothesize and test, pose consistency, pose clustering, invariance, geometric hashing, scale-invariant feature transform [SIFT], speeded-up robust features [SURF], etc.), and so forth.

In accordance with one embodiment, image-processing subsystem 132 processes an image based on both a perceptual grouping for the image (e.g., derived via segmentation, derived via contour detection, etc.) and a geometric-configuration model for the image (e.g., a bounding box model, a constellation, a k-fan, a shape context, one or more scale-invariant feature transforms [SIFTs] defined at a larger context, etc.). An embodiment of image-processing subsystem 132 is described in detail below and with respect to FIGS. 2 through 6.

Figure 2:
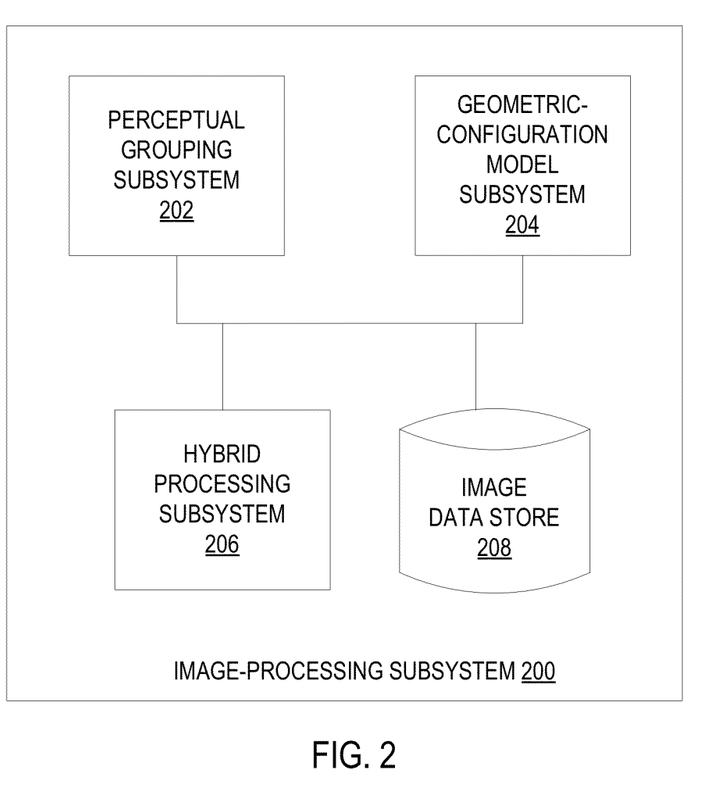
FIG. 2 is a block diagram of one embodiment of an image-processing subsystem.

FIG. 2 is a block diagram of one embodiment of an image-processing subsystem 200. The image-processing subsystem 200 may be the same as the image-processing subsystem 132 of FIG. 1 and may include a perceptual grouping subsystem 202, a geometric-configuration model subsystem 204, a hybrid processing subsystem 206, and an image data store 208.

The image data store 208 may be a temporary buffer or a permanent data store to hold an image that is to be processed. Alternatively, image data store 208 may be hosted by one or more storage devices, such as main memory, magnetic or optical storage based disks, tapes or hard drives, NAS, SAN, and so forth.

The perceptual grouping subsystem 202 identifies a perceptual grouping for an image, such as a segmentation of the image, a grouping based on contour detection, etc. In some embodiments the perceptual grouping might be computed by perceptual grouping subsystem 202 itself, while in some other embodiments the perceptual grouping might be computed by another entity (e.g., an executable library of image processing routines [not depicted in FIG. 1] hosted by server machine 115, etc.) and the results provided to perceptual grouping subsystem 202. The geometric-configuration model subsystem 204 identifies a geometric-configuration model for an image, such as a bounding box, a constellation, a k-fan, a shape context, etc. In some embodiments the geometric-configuration model might be computed by geometric-configuration model subsystem 204 itself, while in some other embodiments the geometric-configuration model might be computed by another entity (e.g., an executable library of image processing routines [not depicted in FIG. 1] hosted by server machine 115, etc.) and the results provided to geometric-configuration model subsystem 204. The hybrid processing subsystem 206 processes an image based on both the perceptual grouping for the image and the geometric-configuration model for the image. In one embodiment, hybrid processing subsystem 206 integrates both the perceptual grouping and the geometric-configuration model by examining the individual pixels in the bins of the geometric-configuration model and assigning to each combination of pixel and group a measure of how strongly the pixel belongs to the group. In accordance with this embodiment, hybrid processing subsystem 206 then computes a value for each pair of bins and each group, based on the membership measures of the individual pixels in each of the two bins, and provides the computed values to object model creator 125. An embodiment of such hybrid processing is described in more detail below with respect to FIGS. 3 through 5.

Figure 3:
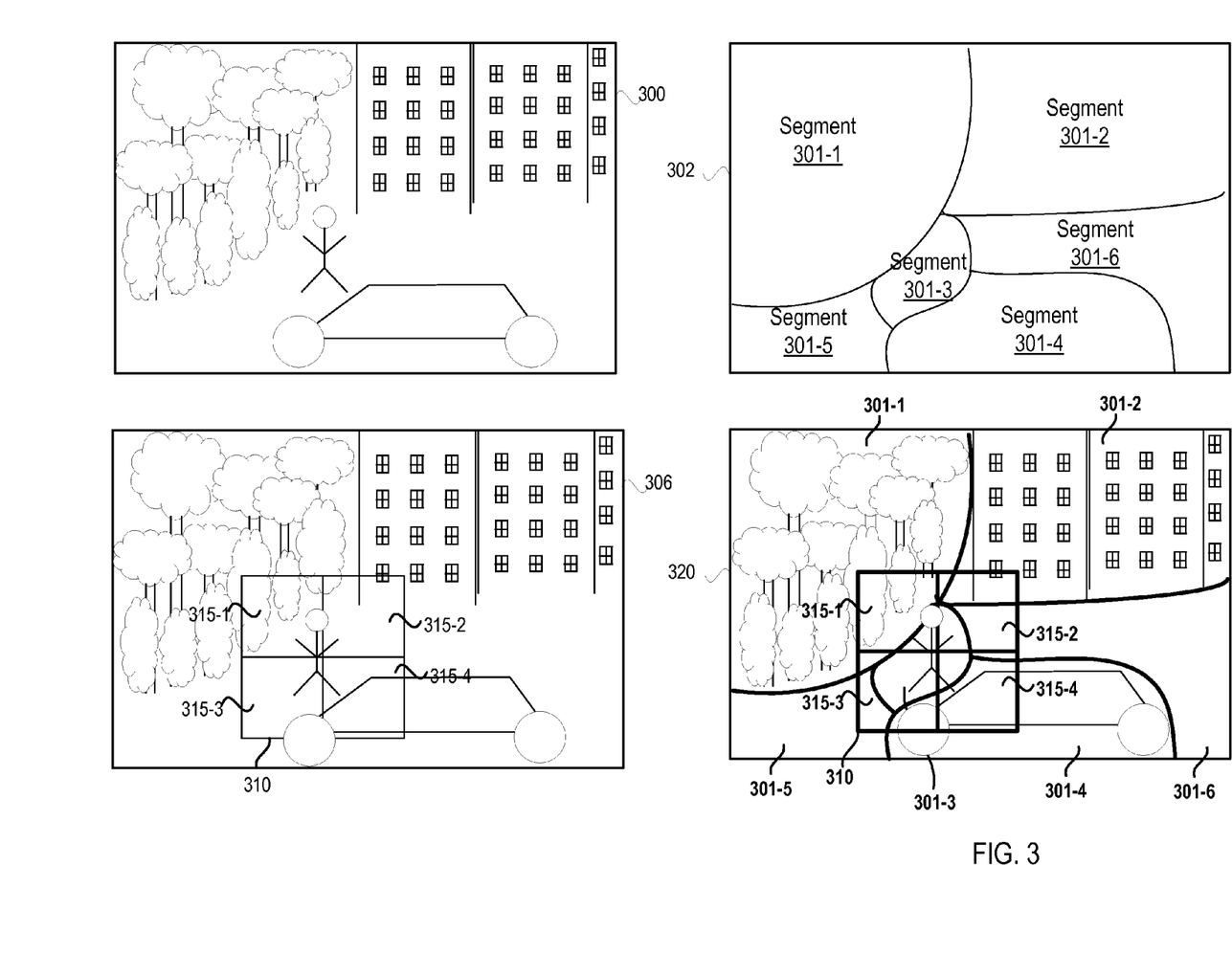
FIG. 3 depicts an illustrative perceptual grouping and an illustrative geometric-configuration model for an image, in accordance with some embodiments of the invention.

FIG. 3 depicts an illustrative perceptual grouping and an illustrative geometric-configuration model for an image, in accordance with some embodiments of the invention. In particular, FIG. 3 depicts an illustrative segmentation of an image and an illustrative bounding box in the image. It should be noted that FIG. 3 is merely illustrative of some embodiments, as some other embodiments might use an alternative type of perceptual grouping (e.g., a grouping based on contour detection, etc.), or an alternative type of geometric-configuration model (e.g., a constellation, a k-fan, a shape context, etc.), or both.

Block 300 depicts an illustrative image 300 having several objects (e.g., a car, a person, etc.). Block 302 illustrates segmentation of image 300 into six segments 301-1 through 301-6, arranged as shown. Block 306 depicts illustrative bounding box 310 centered on the person in image 300, in accordance with an embodiment of the invention. The size and position of illustrative bounding box 310 may be determined in any one of a number of ways, as described above. As shown, illustrative bounding box 310 is divided into four square-shaped bins 315-1 through 315-4. It should be noted that the number of bins in bounding box 310 is merely illustrative, and bounding boxes can have an arbitrary number of bins. It should also be noted that some other bounding boxes might comprise bins of another shape (e.g., rectangular, etc.) rather than square-shaped bins, or might comprise bins that are not uniformly sized, or both.

Block 320 depicts the illustrative segmentation of illustrative image 300 in combination with illustrative bounding box 310, in accordance with an embodiment of the invention. As shown, each of segments 301-1 through 301-6 overlaps with at least one of bins 315-1 through 315-4. Alternatively, for some other combinations of image, segmentation, and bounding box this might not necessarily be the case; for example, if a bounding box is wholly contained within a single segment, then none of the other segments of the image will overlap any bins of the bounding box. In one embodiment, hybrid processing subsystem 206 assigns to every pixel in bounding box 310 a measure of how strongly the pixel belongs to each of segments 301-1 through 301-6. In accordance with this embodiment, hybrid processing subsystem 206 then computes, based on the pixel membership measures, a value for every combination of segment and two bins (i.e., 6 segments times 6 possible pairs of the four bins, for a total of 36 values) and provides these 36 values to object model creator 125.

Figure 4:
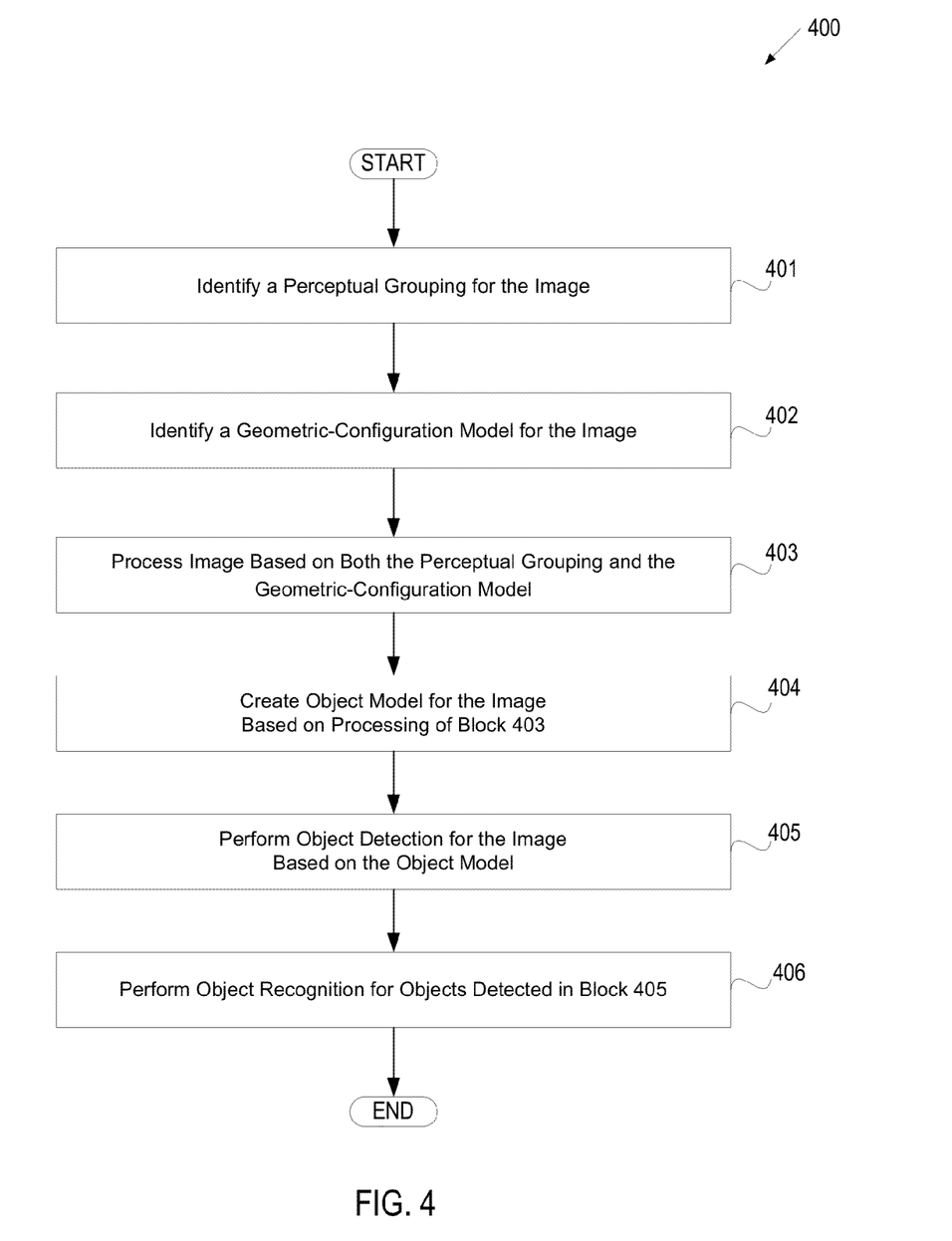
FIG. 4 depicts a flow diagram of one embodiment of a method for recognizing one or more objects in an image.

FIG. 4 depicts a flow diagram of one embodiment of a method 400 for recognizing one or more objects in an image. The method is performed by processing logic that may comprise hardware (circuitry, dedicated logic, etc.), software (such as is run on a general purpose computer system or a dedicated machine), or a combination of both. In one embodiment, the method is performed by the server machine 115 of FIG. 1, while in some other embodiments, one or more of blocks 401 through 406 might be performed by another machine. It should be noted that in some embodiments, the image-processing subsystem 132, object detection/recognition engine 122, and the object model creator 125 may run on separate machines. It should also be noted that blocks depicted in FIG. 4 can be performed simultaneously or in a different order than that depicted.

At block 401, a perceptual grouping for an image is identified. In accordance with one embodiment, block 401 is performed by perceptual grouping subsystem 202 of image-processing subsystem 132. In some such embodiments, perceptual grouping subsystem 202 might itself be capable of computing a perceptual grouping for an image, while in some other embodiments, perceptual grouping subsystem 202 might identify a perceptual grouping for the image that is computed by another entity (e.g., an executable library of image processing routines [not depicted in FIG. 1] hosted by server machine 115, etc.) and provided to image-processing subsystem 132. The perceptual grouping may result in the creation of multiple disjoint groups of pixels (i.e., groups of pixels with no overlap between any of the groups, so that every pixel belongs to a single group).

At block 402, a geometric-configuration model for the image is identified. In accordance with one embodiment, block 402 is performed by geometric-configuration model subsystem 204 of image-processing subsystem 132. In some such embodiments, geometric-configuration model subsystem 204 might itself be capable of constructing a geometric-configuration model for an image, while in some other embodiments, geometric-configuration model subsystem 204 might identify a geometric-configuration model for the image that is computed by another entity (e.g., an executable library of image processing routines [not depicted in FIG. 1] hosted by server machine 115, etc.) and provided to image-processing subsystem 132. The geometric-configuration model may include a set of bins whose positions and sizes are independent of the pixel values of the image (e.g., a set of bins located at predefined intervals within the image, etc.).

At block 403, the image is processed based on both the perceptual grouping identified at block 401 and the geometric-configuration model identified at block 402. In accordance with one embodiment, a value is computed for every combination of two bins of the geometric-configuration model and group of the perceptual grouping. In other words, if a geometric-configuration model comprises n bins in one or more bounding boxes of an image and a perceptual grouping comprises m groups of pixels (e.g., segments) within the image, then $$\frac{n(n-1)}{2} \cdot m$$

values are computed.

In accordance with one such embodiment, each of the computed values is based on how strongly pixels in a pair of bins belong to a particular group. In particular, let:
  $\{b_1, \ldots, b_n\}$ denote the set of bins of the geometric-configuration model, where n is an integer greater than 1;
  $\{g_1, \ldots, g_m\}$ denote the set of groups of the perceptual grouping, where m is an integer greater than 1; and
  $\{h(b_i, b_j, g_k) | 1 \leq i < j \leq n, 1 \leq k \leq m\}$ denote the set of values for each combination of bin pair and group.
In one such embodiment, each value $h(b_i, b_j, g_k)$ is computed as:

$$h(b_i, b_j, g_k) = \sum_{e_1 \in pixels(b_i)} \sum_{e_2 \in pixels(b_j)} p_{g_k}(e_1) p_{g_k}(e_2) \quad \text{(Eq. 1)}$$

where $pixels(b_i)$ denotes the set of pixels in bin $b_i$, and where for any pixel e, $p_{g_k}(e)$ is a measure of how strongly pixel e belongs to group $g_k$.

Figure 5:
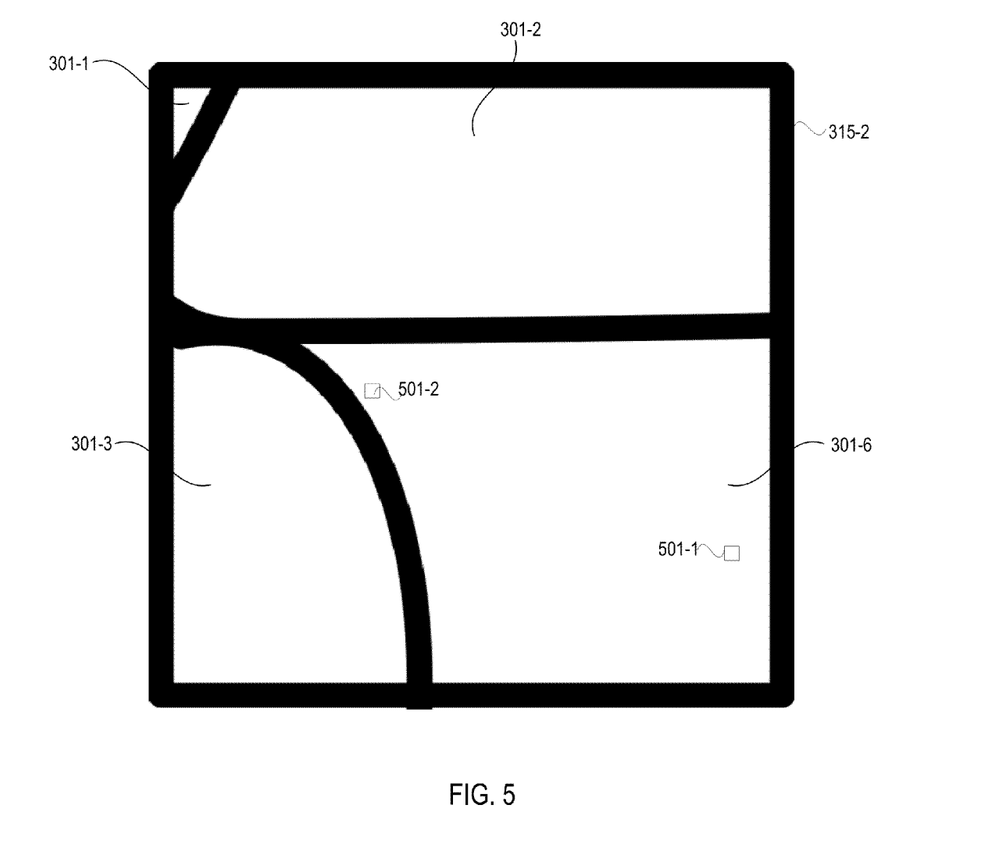
FIG. 5 depicts a zoomed-in view of illustrative bin 315-2, as shown in FIG. 3D, in accordance with an embodiment of the invention.

The intuitive meaning of measure $p_{g_k}(e)$ can be more easily understood by considering FIG. 5, which depicts a zoomed-in view of illustrative bin 315-2, as well as two illustrative pixels of image 300 located in bin 315-2, labeled 501-1 and 501-2, in accordance with an embodiment of the invention. It should be noted that a bin such as illustrative bin 315-2 typically comprises a two-dimensional array of pixels covering the entire bin; however, for simplicity and illustrative purposes, only two such pixels are explicitly depicted in FIG. 5.

As shown in FIG. 5, there are four segments of image 300 that overlap bin 315-2: segment 301-1, segment 301-2, segment 301-3, and segment 301-6. Consider $p_{301-6}(501-1)$ and $p_{301-1}(501-1)$, which are measures of how strongly pixel 501-1 belongs to segments 301-6 and 301-1, respectively. Clearly pixel 501-1 belongs to segment 301-6 much more strongly than it belongs to segment 301-1, and therefore $p_{301-6}(501-1)$ should be much larger than $p_{301-1}(501-1)$. Similarly, pixel 501-1 belongs to segment 301-6 more strongly than it belongs to segments 301-2 or 301-3, though perhaps by a smaller margin than the difference between membership in segment 301-6 and segment 301-1.

Next consider measures $p_{301-6}(501-2)$, $p_{301-3}(501-2)$, $p_{301-2}(501-2)$, and $p_{301-1}(501-2)$, which quantify how strongly pixel 501-2 belongs to segments 301-6, 301-3, 301-2, and 301-1, respectively. As will be appreciated by those skilled in the art, the measures for pixel 501-2 are much less clear-cut than for pixel 501-1. For example, pixel 501-2 is within segment 301-6, but it is near two boundaries of segment 301-6, one shared with segment 301-3 and one shared with segment 301-3. Consequently, in one embodiment an exemplary set of values for these measure might be:

$p_{301-6}(501-2)=0.7$ $p_{301-3}(501-2)=0.3$ $p_{301-2}(501-2)=0.2$ $p_{301-1}(501-2)=0$ \hfill (Eq. 2)

In some embodiments measure $p_{g_k}(e)$ might be a real number in [0, 1], as in the example above, while in some other embodiments $p_{g_k}(e)$ might have a different range, or might have quantized values, or both (for example, an integer between 1 and 10 inclusive).

It should be noted that some other embodiments might employ a different methodology for performing block 403 than that of the embodiment above. For example, some other embodiments might use a different formula than that of Equation 1 for processing measure $p_{g_k}(e)$, or might use a different measure than $p_{g_k}(e)$, or might not use any measure at all, or might not use a formula at all. As yet other examples, some other embodiments might not process bin pairs, but might instead process single bins, or some other combinations of bins (e.g., triads, etc.), while in still some other embodiments the image might be processed based on the perceptual grouping identified at block 401 and the geometric-configuration model identified at block 402 in some completely different manner than that of the embodiment above.

In some embodiments, a maximum over all groups might also be computed for each bin pair, as follows:

$$h_{max}(b_i, b_j) = \max_{1 \leq k \leq m} \{h(b_i, b_j, g_k)\} \qquad (Eq.\ 3)$$

This measure, which reflects the maximum chance that two bins $b_i$ and $b_j$ see the same grouping, factors out the group index, which can change across images. The values for this measure can then be used, in conjunction with the values computed in Equation 1, to build a feature vector for use in the object model creation and object detection/recognition tasks of blocks 404 through 406, described below. It should be noted that in some other embodiments a variation of Equation 3 might be employed to compute the composite measures for the bin pairs (e.g., computing a weighted mean rather than the maximum, etc.).

At block 404, an object model is created based on the processing of the image at block 403. For example, in some embodiments the object model may be created by learning the object model from labeled training data, where the objects of interest in each image in the training data have a manually-selected bounding box. For each such label object, one can extract a representation as described above. For example, the measure values computed in Equation 2 could be used to obtain a representation in the same manner as for patch-based object detectors. This representation can be used to train any standard classifier, such as a Support Vector Machine (SVM), AdaBoost, etc. to obtain a model. Due to the fixed geometry of the bounding box and its bins, the object model can be stored in memory using a fixed-size vector.

At block 405, a method of object detection is performed for the image based on the object model created at block 404. For example, object detection may be performed using a histogram of oriented gradients (HOG), or part-models such as k-fans, constellation models, pictorial structure, and so forth.

At block 406, a method of object recognition is performed for the objects detected at block 405. For example, object recognition may be performed via computer aided design (CAD)-like techniques, such as those of Man, Mohan and Nevatia, Lowe, Faugeras, etc.; recognition by parts techniques, such as those of Binford, Biederman, Dickinson, Forsyth and Ponce, etc.; appearance-based techniques, such as edge matching, divide-and-conquer search, grayscale matching, gradient matching, etc.; feature-based techniques, such as interpretation trees, hypothesize and test, pose consistency, pose clustering, invariance, geometric hashing, scale-invariant feature transform (SIFT), speeded-up robust features (SURF), etc.; and so forth.

Figure 6:
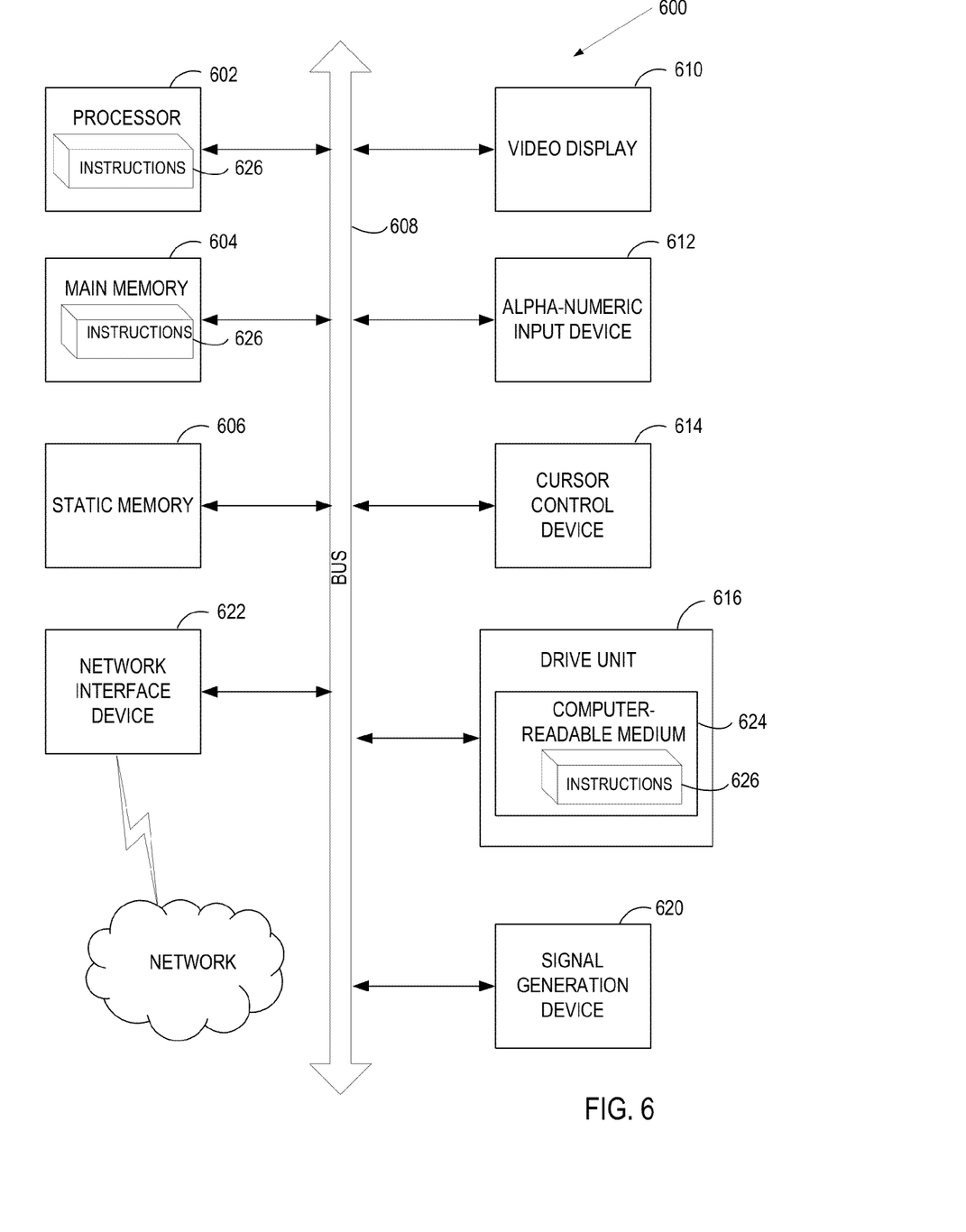
FIG. 6 depicts a block diagram of an illustrative computer system operating in accordance with embodiments of the invention.

FIG. 6 illustrates an exemplary computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 606.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., instructions executed by image-processing subsystem 132 and corresponding to blocks 401 through 406, etc.) embodying any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network 620 via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "processing," "computing," "creating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. For example, in some embodiments, the representation that is derived from a perceptual grouping might be used for the tasks of object detection and recognition, or might be used in systems that derive features from image patches to obtain a new "perceptual patch representation." Moreover, in some embodiments the concept of groupings can be extended to video, using continuity in time in the same manner as continuity in space. The scope of the invention should, therefore, be determined with reference to the appended claims, along with the full scope of equivalents to which such claims are entitled.

What is claimed is:

1. A method comprising:
   identifying a perceptual grouping for an image, wherein the perceptual grouping comprises a plurality of disjoint groups of pixels, and wherein the perceptual grouping is based on contents of the image;
   identifying a geometric-configuration model for the image, wherein the geometric-configuration model comprises a set of bins located at predefined intervals within the image; and
   detecting, by a processing device, one or more objects in the image based on a set of values, wherein each of the values is derived from (i) a respective pair of the bins, and (ii) a group of the perceptual grouping.

2. The method of claim 1 wherein $\{b_1, \ldots, b_n\}$ denotes the set of bins, and wherein n is an integer greater than 1, and wherein $\{g_1, \ldots, g_m\}$ denotes the set of groups of the perceptual grouping, and wherein m is an integer greater than 1, and wherein $\{h(b_i, b_j, g_k) | 1 \le i < j \le n, 1 \le k \le m\}$ denotes the set of values, and wherein $$h(b_i, b_j, g_k) = \sum_{e_1 \in pixels(b_i)} \sum_{e_2 \in pixels(b_j)} p_{g_k}(e_1) p_{g_k}(e_2),$$

and wherein $p_{g_k}(e)$ is a measure of how strongly a pixel e belongs to group $g_k$.

3. The method of claim 2 wherein $p_{g_k}(e)$ is a real number in [0, 1].

4. The method of claim 2 wherein the set of values also includes members of a set $\{h(b_i, b_j) | 1 \le i < j \le n\}$, and wherein $$h_{max}(b_i, b_j) = \max_{1 \le k \le m} \{h(b_i, b_j, g_k)\}.$$

5. The method of claim 1 wherein the geometric-configuration model comprises a bounding box.

6. The method of claim 5 wherein the geometric-configuration model also comprises a histogram of oriented gradients.

7. The method of claim 1 wherein the perceptual grouping is based on segmentation.

8. The method of claim 1 further comprising recognizing one or more objects in the image based on a representation that is derived from the perceptual grouping.

9. The method of claim 1 wherein the image is one of a series of images of a video, and wherein the perceptual grouping is also based on continuity between the image and one or more other images of the video.

10. An apparatus comprising:
    a memory to store an image; and
    a processing device, coupled to the memory, to:
       identify a perceptual grouping for the image, wherein the perceptual grouping comprises a plurality of disjoint groups of pixels, and wherein the perceptual grouping is based on contents of the image;

identify a geometric-configuration model for the image, wherein the geometric-configuration model comprises a set of bins located at predefined intervals within the image; and detect one or more objects in the image based on a set of values, wherein each of the values is derived from (i) a respective pair of the bins, and (ii) a group of the perceptual grouping.

11. The apparatus of claim 10 wherein $\{b_1, \ldots, b_n\}$ denotes the set of bins, and wherein n is an integer greater than 1, and wherein $\{g_1, \ldots, g_m\}$ denotes the set of groups of the perceptual grouping, and wherein m is an integer greater than 1, and wherein $\{h(b_i,b_j,g_k)|1\le i<j\le n, 1\le k\le m)\}$ denotes the set of values, and wherein $$h(b_i, b_j, g_k) = \sum_{e_1 \in pixels(b_i)} \sum_{e_2 pixels(b_j)} p_{g_k}(e_1) p_{g_k}(e_2),$$

and wherein $p_{g_k}(e)$ is a measure of how strongly a pixel e belongs to group $g_k$.

12. The apparatus of claim 11 wherein $p_{g_k}(e)$ is a real number in [0, 1].

13. The apparatus of claim 11 wherein the set of values also includes members of a set $\{\bar{h}(b_i,b_j)|1<j\le n\}$, and wherein $\bar{h}(b_i,b_j)$ is based on a weighted sum of $\{h(b_i,b_j,g_k)|1\le k\le m)\}$.

14. The apparatus of claim 10 wherein the geometric-configuration model comprises a bounding box.

15. The apparatus of claim 14 wherein the geometric-configuration model also comprises a histogram of oriented gradients.

16. The apparatus of claim 10 wherein the perceptual grouping is based on contour detection.

17. The apparatus of claim 10 wherein the processing device is further to recognize one or more objects in the image based on a representation that is derived from the perceptual grouping.

18. The apparatus of claim 10 wherein the image is one of a series of images of a video, and wherein the perceptual grouping is also based on continuity between the image and one or more other images of the video.

19. A non-transitory computer-readable storage medium, having instructions stored therein, which when executed, cause a processing device to perform operations comprising:

identifying a perceptual grouping for an image, wherein the perceptual grouping comprises a plurality of disjoint groups of pixels, and wherein the perceptual grouping is based on contents of the image;

identifying a geometric-configuration model for the image, wherein the geometric-configuration model comprises a set of bins located at predefined intervals within the image; and detecting, by the processing device, one or more objects in the image based on a set of values, wherein each of the values is derived from (i) a respective pair of the bins, and (ii) a group of the perceptual grouping.

20. The non-transitory computer-readable storage medium of claim 19 wherein $\{b_1, \ldots, b_n\}$ denotes the set of bins, and wherein n is an integer greater than 1, and wherein $\{g_1, \ldots g_m\}$ denotes the set of groups of the perceptual grouping, and wherein m is an integer greater than 1, and wherein $\{h(b_i,b_j,g_k)|1\le i<j\le n, 1\le k\le m)\}$ denotes the set of values, and wherein $$h(b_i, b_j, g_k) = \sum_{e_1 \in pixels(b_i)} \sum_{e_2 pixels(b_j)} p_{g_k}(e_1) p_{g_k}(e_2),$$

and wherein $p_{g_k}(e)$ is a measure of how strongly a pixel e belongs to group $g_k$.

21. The non-transitory computer-readable storage medium of claim 20 wherein $p_{g_k}(e)$ is a real number in [0, 1].

22. The non-transitory computer-readable storage medium of claim 19 wherein the geometric-configuration model comprises a bounding box.

23. The non-transitory computer-readable storage medium of claim 19 wherein the perceptual grouping is based on segmentation.

* * * * *